United States Patent
Ku et al.

(10) Patent No.: US 8,165,116 B2
(45) Date of Patent: Apr. 24, 2012

(54) METHOD AND SYSTEM TO PROVIDE CONTACT SERVICES IN A COMMUNICATION NETWORK

(75) Inventors: Bernard Ku, Austin, TX (US); Mehrad Yasrebi, Austin, TX (US); Chaoxin Qiu, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 463 days.

(21) Appl. No.: 11/954,833

(22) Filed: Dec. 12, 2007

(65) Prior Publication Data
US 2009/0154451 A1 Jun. 18, 2009

(51) Int. Cl.
H04L 12/28 (2006.01)

(52) U.S. Cl. ........ 370/389; 370/310; 370/350; 370/352; 370/401

(58) Field of Classification Search .................. 370/230, 370/352; 707/100; 709/203
See application file for complete search history.

(56) References Cited

U.S. PATENT DOCUMENTS

| | | | |
|---|---|---|---|
| 3,428,750 A | 2/1969 | Hoffman | |
| 3,478,174 A | 11/1969 | MacLeod et al. | |
| 3,787,632 A | 1/1974 | Male et al. | |
| 6,161,008 A | 12/2000 | Lee | |
| 6,694,004 B1 | 2/2004 | Knoerle | |
| 6,697,478 B1 | 2/2004 | Meldrum | |
| 6,816,582 B2 | 11/2004 | Levine | |
| 6,978,003 B1 | 12/2005 | Sylvain | |
| 7,072,303 B2 | 7/2006 | MeLampy et al. | |
| 7,565,434 B1 | 7/2009 | Chaturvedi et al. | |
| 7,881,449 B2 * | 2/2011 | Hanson et al. | 379/211.02 |
| 7,912,963 B2 | 3/2011 | Jackson | |
| 2003/0097485 A1 | 5/2003 | Horvitz | |
| 2003/0128693 A1 | 7/2003 | Segal | |
| 2003/0131069 A1 | 7/2003 | Lucovsky | |
| 2003/0131142 A1 | 7/2003 | Horvitz | |
| 2004/0003114 A1 | 1/2004 | Adamczyk | |
| 2004/0047341 A1 | 3/2004 | Staack | |
| 2005/0195802 A1 | 9/2005 | Klein | |
| 2005/0195954 A1 | 9/2005 | Klein | |
| 2005/0201362 A1 | 9/2005 | Klein | |
| 2005/0207402 A1 * | 9/2005 | Kobayashi et al. | 370/352 |
| 2006/0036642 A1 | 2/2006 | Horvitz | |
| 2006/0072726 A1 | 4/2006 | Klein | |
| 2006/0077965 A1 * | 4/2006 | Garcia-Martin et al. | 370/352 |
| 2006/0120362 A1 | 6/2006 | Westman et al. | |
| 2006/0165060 A1 | 7/2006 | Dua | |
| 2006/0167977 A1 | 7/2006 | Wu | |

(Continued)

OTHER PUBLICATIONS

Mealling, M. and Daniel, R. "The Naming Authority Pointer (NAPTR) DNS Resource Record", Request for Comments: 2915, Sep. 2000, 17 pp.

(Continued)

*Primary Examiner* — Robert Wilson
*Assistant Examiner* — Mohamed Kamara
(74) *Attorney, Agent, or Firm* — Toler Law Group, PC

(57) ABSTRACT

A communication system includes an application server that includes logic to recognize that preference data in each of a plurality of data record entries of a subscriber record has a common value. Each data record entry includes a Uniform Resource Identifier (URI), and the subscriber record is stored in a telephone number mapping (ENUM) server. The application server also includes logic to issue a command to initiate contact concurrently with devices identified by URIs in the subscriber record via an Internet Protocol Multimedia Subsystem (IMS).

21 Claims, 9 Drawing Sheets

U.S. PATENT DOCUMENTS

| | | | |
|---|---|---|---|
| 2006/0195460 A1* | 8/2006 | Nori et al. | 707/100 |
| 2006/0209690 A1 | 9/2006 | Brooke | |
| 2007/0019623 A1 | 1/2007 | Alt | |
| 2007/0043829 A1 | 2/2007 | Dua | |
| 2007/0104184 A1 | 5/2007 | Ku et al. | |
| 2007/0106612 A1 | 5/2007 | O'Brien | |
| 2007/0116250 A1 | 5/2007 | Stafford | |
| 2007/0129108 A1 | 6/2007 | Swanburg | |
| 2008/0019267 A1 | 1/2008 | Ku et al. | |
| 2008/0090569 A1 | 4/2008 | Khan et al. | |
| 2008/0146201 A1 | 6/2008 | O'Neill et al. | |
| 2008/0198839 A1 | 8/2008 | Ku et al. | |
| 2008/0247526 A1 | 10/2008 | Qiu et al. | |
| 2008/0262958 A1 | 10/2008 | Ku et al. | |
| 2008/0263389 A1 | 10/2008 | Ku et al. | |
| 2008/0267075 A1 | 10/2008 | Yasrebi et al. | |
| 2008/0281975 A1 | 11/2008 | Qiu et al. | |
| 2008/0285543 A1 | 11/2008 | Qiu et al. | |
| 2008/0311888 A1 | 12/2008 | Ku et al. | |
| 2008/0317000 A1 | 12/2008 | Jackson | |
| 2009/0005038 A1 | 1/2009 | Yasrebi et al. | |
| 2009/0007216 A1 | 1/2009 | Ku et al. | |
| 2009/0040923 A1* | 2/2009 | Bantukul et al. | 370/230 |
| 2009/0059894 A1 | 3/2009 | Jackson et al. | |
| 2009/0059895 A1 | 3/2009 | Yasrebi et al. | |
| 2009/0064243 A1 | 3/2009 | Ku et al. | |
| 2009/0067409 A1 | 3/2009 | Ku et al. | |
| 2009/0074156 A1 | 3/2009 | Ku et al. | |
| 2009/0077179 A1 | 3/2009 | Bi et al. | |
| 2009/0089188 A1 | 4/2009 | Ku et al. | |
| 2009/0097471 A1 | 4/2009 | Qiu et al. | |
| 2009/0097619 A1 | 4/2009 | Jackson et al. | |
| 2009/0100152 A1 | 4/2009 | Soo et al. | |
| 2009/0106291 A1 | 4/2009 | Ku et al. | |
| 2009/0113472 A1 | 4/2009 | Sheth et al. | |
| 2009/0116623 A1 | 5/2009 | Ku et al. | |
| 2009/0132632 A1 | 5/2009 | Jackson et al. | |
| 2009/0133085 A1 | 5/2009 | Soo et al. | |
| 2009/0133089 A1 | 5/2009 | Ku et al. | |
| 2009/0147770 A1 | 6/2009 | Ku | |
| 2009/0150951 A1 | 6/2009 | Soo et al. | |
| 2009/0154451 A1 | 6/2009 | Ku et al. | |
| 2009/0154452 A1 | 6/2009 | Ku et al. | |
| 2009/0161666 A1 | 6/2009 | Ku | |
| 2009/0161853 A1 | 6/2009 | Ku et al. | |
| 2009/0161854 A1 | 6/2009 | Ku et al. | |
| 2009/0197563 A1 | 8/2009 | Yasrebi et al. | |
| 2009/0213837 A1 | 8/2009 | Ku et al. | |
| 2009/0249416 A1 | 10/2009 | Ku et al. | |
| 2009/0296566 A1 | 12/2009 | Yasrebl et al. | |
| 2009/0296567 A1 | 12/2009 | Yasrebi et al. | |
| 2010/0090964 A1 | 4/2010 | Soo et al. | |
| 2010/0098234 A1 | 4/2010 | Ku et al. | |
| 2010/0103139 A1 | 4/2010 | Soo et al. | |
| 2010/0124216 A1 | 5/2010 | Ku | |
| 2010/0125894 A1 | 5/2010 | Yasrebi et al. | |
| 2010/0130177 A1 | 5/2010 | Ku et al. | |
| 2010/0149995 A1 | 6/2010 | Khan et al. | |
| 2010/0150132 A1 | 6/2010 | Ku | |
| 2010/0150143 A1 | 6/2010 | Ku | |
| 2010/0150144 A1 | 6/2010 | Ku | |
| 2010/0150145 A1 | 6/2010 | Ku | |
| 2010/0150332 A1 | 6/2010 | Soo et al. | |
| 2010/0153563 A1 | 6/2010 | Ku | |
| 2010/0154011 A1 | 6/2010 | Soo et al. | |
| 2010/0157977 A1 | 6/2010 | Ku | |
| 2010/0158229 A1 | 6/2010 | Ku | |
| 2010/0208634 A1* | 8/2010 | Eng et al. | 370/310 |
| 2010/0232592 A1 | 9/2010 | Ku | |
| 2010/0232593 A1 | 9/2010 | Ku | |
| 2010/0266110 A1 | 10/2010 | Soo et al. | |
| 2010/0272101 A1 | 10/2010 | Ku et al. | |
| 2010/0278171 A1 | 11/2010 | Ku et al. | |
| 2011/0019661 A1 | 1/2011 | Ku | |
| 2011/0022593 A1 | 1/2011 | Ku et al. | |
| 2011/0055347 A1 | 3/2011 | Hu et al. | |
| 2011/0135078 A1 | 6/2011 | Soo et al. | |
| 2011/0142035 A1 | 6/2011 | Ku et al. | |

OTHER PUBLICATIONS

Faltstrom, P. "The E.164 to Uniform Resource Identifiers (URI) Dynamic Delegation Discovery System (DDDS) Application (ENUM)", Request for Comments: 3761, Apr. 2004, 17 pp.

Faltstrom, P. "E.164 Number and DNS", Request for Comments: 2916, Sep. 2000, 10 pp.

Rosenberg, Jonathan "Evolution of Presence Based Networks," www.jdrosen.net/papers/fallim2000_evolution.ppt; Nov. 30, 2000, 20 pages.

* cited by examiner

METHOD AND SYSTEM TO PROVIDE CONTACT SERVICES IN A COMMUNICATION NETWORK

FIELD OF THE DISCLOSURE

The present disclosure is generally related to a method and system to provision and provide contact services.

BACKGROUND

Provisioning and providing contact services in a communication network typically involves multiple work flows and steps, and often involves a large coordination effort. It can be a tedious, time consuming and error prone process that may involve changes to several systems, such as central data storage, Private Branch Exchange (PBX) systems, Advanced Intelligent Network (AIN) triggers, Central Office switch logic, and Signaling System Seven (SS7) internetworking systems. Hence, there is a need for an improved method and system to provision and provide contact services in a communication network.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings may indicate similar or identical items.

DETAILED DESCRIPTION

Figure 1:
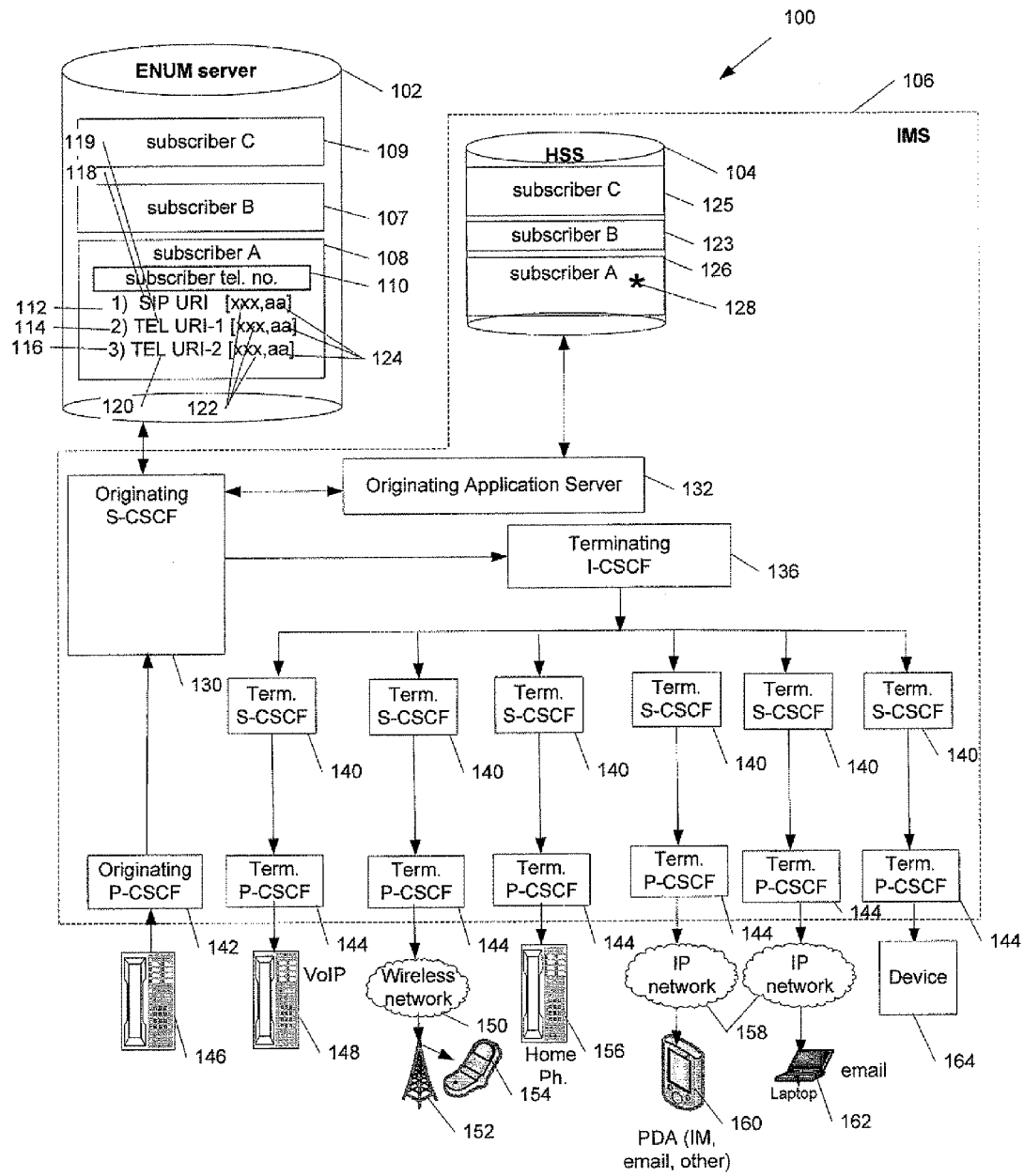
FIG. 1 is a diagram of a particular illustrative embodiment of a system to provide contact services in a communication network.

The disclosure is generally directed to a system and method to provision and provide contact services in a communication network. In a particular embodiment, the system includes an Internet Protocol Multimedia Subsystem (IMS) and a telephone number mapping (ENUM) server. The ENUM server can communicate with the IMS. The ENUM server includes a plurality of records, and typically includes one subscriber record for each subscriber to a contact service. A subscriber record may be associated with a subscriber telephone number. The subscriber record can include data record entries, with each data record entry including a Uniform Resource Indicator (URI), corresponding order data and corresponding preference data. During operation, the IMS may receive a call to the subscriber telephone number. An application server may verify that the order data associated with each of the URIs in the associated subscriber record have a common value, and that the preference data associated with each of the URIs in the associated subscriber record have a common value. The IMS may receive the URIs from the subscriber record after verification that the subscriber is actively registered for contact service. The IMS may proceed to concurrently contact destination devices identified by the URIs. The IMS may set up an end-to-end communication path with the first destination device to respond, and may cancel INVITE messages to the other destination devices.

In a particular embodiment, the system includes an application server including logic to recognize that preference data in each of a plurality of data record entries of a subscriber record has a common value, where each data record entry includes a Uniform Resource Identifier (URI), and where the subscriber record is stored in a telephone number mapping (ENUM) server. The application server also includes logic to issue a command to initiate contact concurrently with devices identified by URIs in the subscriber record via an Internet Protocol Multimedia Subsystem (IMS).

In another embodiment, a method includes determining that order data associated with a plurality of Uniform Resource Identifiers (URIs) identified with corresponding devices have a common order value and that preference data associated with the plurality of corresponding URIs have a common preference value, where the order data and the preference data for each corresponding URI is included in a corresponding data record entry that is stored in a telephone number mapping (ENUM) server. The method also includes initiating invite messages concurrently via an Internet Protocol Multimedia Subsystem (IMS) to concurrently contact devices identified by the plurality of URIs.

In another embodiment, a method of registering a plurality of devices of a subscriber includes receiving a plurality of Uniform Resource Indicators (URIs) associated with a subscriber, each URI identifying a device associated with the subscriber. The method further includes receiving an indication that upon receipt of a contact request the devices are to be contacted concurrently, and assigning a common order value and a common preference value to each of the plurality of URIs in response to receiving the indication. The method further includes forming a plurality of data record entries, each data record entry including one of the plurality of URIs, the common order value, and the common preference value. The method also includes storing the plurality of data record entries in a telephone number mapping (ENUM) server.

In another embodiment, a computer readable medium is disclosed and includes computer executable instructions to cause a processor to receive a contact request via a subscriber telephone number associated with a subscriber and initiate invite messages concurrently via an Internet Protocol Multimedia Subsystem (IMS) to concurrently contact each of a plurality of devices associated with the subscriber in response to the contact request. The plurality of devices are identified by a corresponding plurality of Uniform Resource Indicators (URIs) that are stored in a telephone number mapping (ENUM) server, and each URI has a common order value and a common preference value associated with it.

FIG. 1 is a block diagram of a particular embodiment of a system 100 to provide contact services in a communication network. The system 100 includes a Telephone Number Mapping (ENUM) server (also ENUM database herein) 102 communicating with a Home Subscriber Server (SS) 104, and also communicating with other components in an IP Multimedia Subsystem (IMS) 106. The system 100 may also include an Originating device 146 and one or more destination devices 148, 154, 156, 160, 162, and 164. Device 164 may be a public switched telephone network (PSTN) device, a public land mobile network (PLMN) device, or another device.

In a particular illustrative embodiment, the IMS 106 includes an Originating Proxy-Call Session Control Function (P-CSCF) 142, an Originating Serving-Call Session Control Function (S-CSCF) 130, an Originating Application Server 132, a Terminating Interrogating Call Session Control Function (I-CSCF) 136, and one or more Terminating S-CSCFs 140. Each Terminating S-CSCF 140 is coupled to a corresponding Terminating P-CSCF 144. Each of the Terminating P-CSCFs 144 may communicate with a corresponding destination device, such as a Voice over Internet Protocol (VoIP) device 148. One Originating P-CSCF 142, one Originating S-CSCF 130, and Originating Application Server 132 are shown in FIG. 1; however in another particular illustrative embodiment, there may be more than one Originating P-CSCF, more than one Originating S-CSCF, and more than one Originating Application Server.

In a particular embodiment, the Originating device 146 may originate a contact request by placing a call to the Originating P-CSCF 142. The call may be directed to a subscriber telephone number. In a particular illustrative embodiment, the subscriber telephone number may be an E.164 telephone number. The Originating P-CSCF 142 may communicate the contact request to the Originating S-CSCF 130. The Originating S-CSCF 130, in response to the contact request, can inquire to the ENUM server 102 about an address, e.g., a Uniform Resource Identifier (URI) associated with a destination device to be contacted. In the following illustrative sample scenario, Originating Device 146 is being used to contact subscriber A.

In response to the inquiry (also contact request herein), the ENUM server 102 may locate a subscriber record corresponding to the subscriber telephone number and retrieve one or more Uniform Resource Indicators (URIs) that correspond to the called subscriber telephone number. For example, a subscriber A that subscribes to a contact service may have a subscriber record 108 stored within the ENUM server 102, in which a subscriber telephone number 110 has been recorded. The subscriber record 108 may include one or more data record entries, such as data record entries 112, 114, and 116. URIs 118, 119, 120 may be stored in the subscriber record 108 and each URI may correspond to a particular destination device, such as one of the destination devices 148, 154, 156, 160, 162, or 164. Each additional subscriber of the system, such as a subscriber B and a subscriber C, may also have a corresponding subscriber record stored in the ENUM server 102. For example, subscriber B has a subscriber record 107 and subscriber C has a subscriber record 109. The Originating Application Server 132 or Originating S-CSCF 130 may verify, through, e.g., communicating with the HSS 104, that subscriber A is actively registered for a contact service. The HSS 104 may include a subscription accounting record 126 corresponding to subscriber A. The subscription accounting record 126 may include an indicator 128 indicating that subscriber A is an active subscriber to the contact service. Each additional subscriber of the system, such as a subscriber B and a subscriber C, may also have a corresponding subscription accounting record stored in the HSS 104. For example, subscriber B has a subscription accounting record 123 and subscriber C has a subscription accounting record 125.

The Originating Application Server 132 or the Originating S-CSCF 130 may determine that each of the data record entries 112, 114 and 116 includes a common order value 122 (order value and order data value are used interchangeably herein) and a common preference value 124 (preference value and preference data value are used interchangeably herein). The Originating Application Server 132 may issue a command to, e.g., the Originating S-CSCF 130, to initiate contact concurrently with devices identified by URIs 112, 114, and 116, in response to determining that each of the URIs has the common order value 122 and the common preference value 124. The Originating S-CSCF 130 may receive the command from the Originating Application Server 132 and may also receive the URIs 112, 114, and 116 from the ENUM server 102, or via the Originating Application Server 132, which may receive the URIs 112, 114, and 116 from the ENUM server 102. The Originating S-CSCF 130 may then issue INVITE messages concurrently to concurrently contact each destination device identified by the corresponding URI.

The Originating S-CSCF 130 may send the INVITE messages, such as one or more Session Initiation Protocol (SIP) INVITE messages, to the Terminating I-CSCF 136. In a particular illustrative embodiment, the Originating Application Server 132 may provide a communication, such as a pre-recorded message, to be delivered to one or more of the destination devices being contacted.

For each INVITE message issued, the Terminating I-CSCF 136 may contact one of the Terminating S-CSCFs 140. A contacted Terminating S-CSCF 140 may contact a Terminating P-CSCF 144, which in turn may contact an associated destination device, e.g., VoIP device 148, cellular telephone device 154, home telephone 156, Personal Digital Assistant (PDA) 160, computer 162, or device 164. For example, one of the Terminating P-CSCFs 144 may contact the cellular telephone 154 via a wireless network 150 and a cellular tower 152. In another example, one of the Terminating P-CSCFs 144 may contact the PDA 160 via an Internet Protocol (IP) network 158. In yet another example, one of the Terminating P-CSCFs 144 may contact the computer 162 via an IP network 158. When contact is established with a particular device, attempts to contact other devices may cease, which may be accomplished by the Originating S-CSCF 130 canceling INVITE messages to the other devices. An end-to-end communication path may be established between the Originating Device 146 and the first available and ready destination device, such that communication occurs between the Originating Device 146 and the first destination device with which contact is established.

Figure 2:
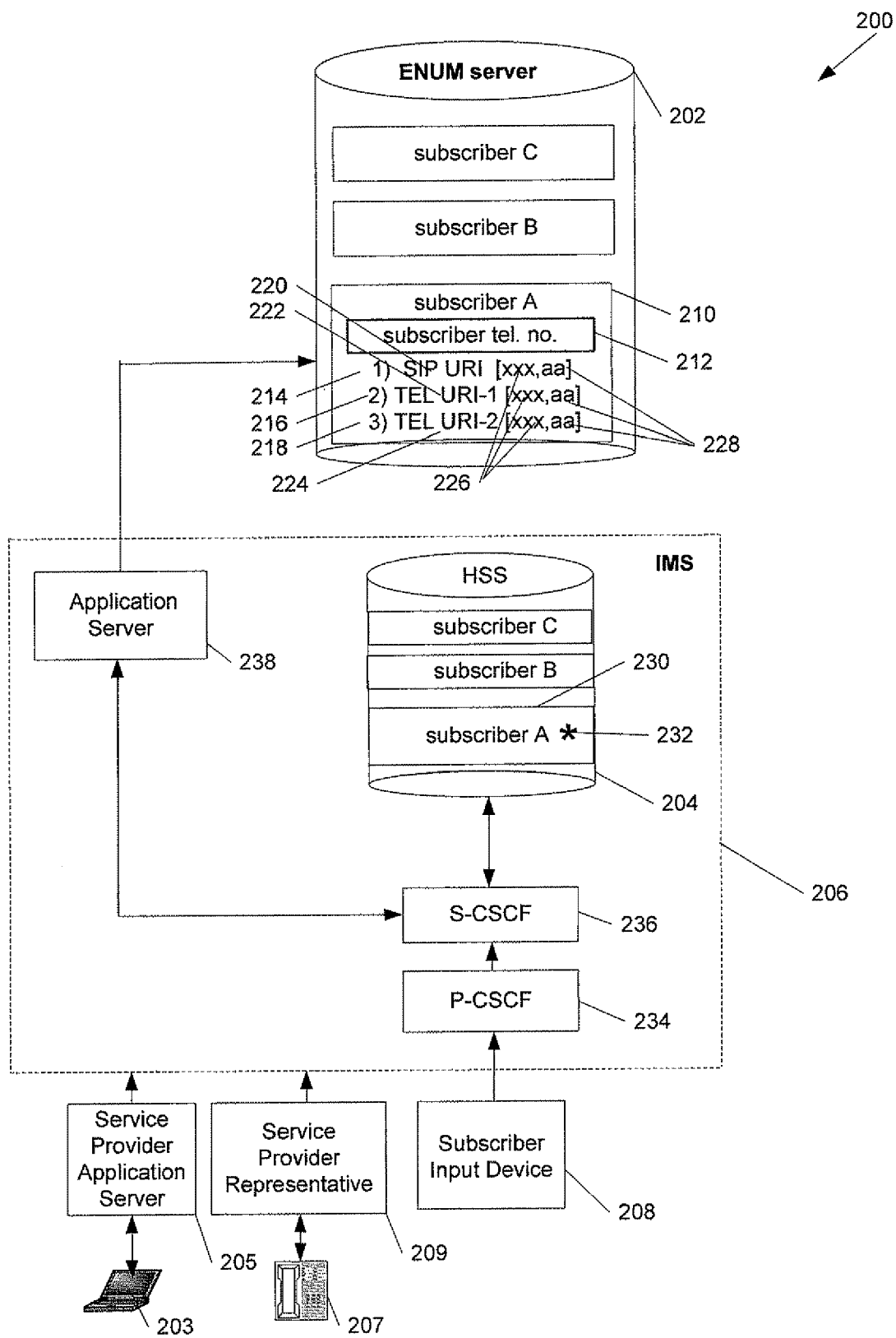
FIG. 2 is a diagram of a particular illustrative embodiment of a system to provision contact services in a communication network.

FIG. 2 is a diagram of a particular illustrative embodiment of a system to provision contact services in a communication network. Provisioning may include configuring data within a system such as a Telephone Number Mapping (ENUM) server. A communication system 200 includes a Telephone Number Mapping (ENUM) server 202 coupled with an Internet Protocol Multimedia Subsystem (IMS) 206. The IMS 206 may include a Home Subscriber Server (HSS) 204, as well as other components (not shown). In a particular illustrative embodiment, a Subscriber Input Device 208, such as a Voice-over Internet Protocol (VoIP) device, may provide input via an Originating Proxy-Call Session Control Function (P-CSCF) 234 within the IMS 206. The IMS 206 may include the Originating P-CSCF 234 coupled to a Serving-Call Session Control Function (S-CSCF) 236, and the Application Server 238. In another particular illustrative embodiment, a computer 203 may provide input via a Service Provider Application Server 205 that may act as an interactive application or another information input system to convey data to the IMS 206. In yet another particular illustrative embodiment, an alternative input device 207 may be used to provide input to the IMS via a Service Provider Representative 209, which may interact with the alternative input device 207 via e.g., a human operator, an automated information input system, or another information input system.

In operation, a subscriber A may set up a subscriber record within the ENUM server 202 by various means, such as via a service provider application. The HSS 204 may include a subscription accounting record for each subscriber, such as subscription accounting record 230. The subscription accounting record 230 can include an indicator 232 indicating that a registration status of a subscription of subscriber A to a contact service is active.

Contact data related to the subscriber A may be provided to the IMS 206 for storage in the ENUM server 202. In an illustrative embodiment, subscriber A may provide or modify the contact data. In a particular illustrative embodiment, the contact data (or modified contact data) may be supplied to the Application Server 238 in the IMS 206 from the Subscriber Input Device 208, such as a telephone, a computer, a personal digital assistant, or another device. For instance, subscriber A may provide contact data including a subscriber telephone number to be called, and one or more of the URIs to be stored, each U identifying a corresponding destination device. The contact data may also include an indication, which may be provided by, e.g., the subscriber A, that the destination devices identified by the corresponding URIs provided are to be contacted concurrently when a contact request is received by the IMS 206. In another particular illustrative embodiment, the contact data may be provided to the IMS 206 via the Service Provider Application Server 203.

The Application Server 238 may provide to the ENUM server 202 the contact data associated with subscriber A that is received by the MS 206. In response to receiving the indication that the destination devices identified by the corresponding URIs provided are to be contacted concurrently upon receipt of the contact request, the Application Server 238 may provide a common order value and a common preference value to be associated with each URI. The ENUM server 202 may place each URI in a data record entry, along with the common order value and the common preference value, and each data record entry may be stored in a subscriber record, such as subscriber record 210. The subscriber record 210 may also include the subscriber telephone number 212, which may be supplied by the Application Server 238 as part of the contact data supplied to the IMS 206. For example, the subscriber record 210 may include a first data record entry 214 that includes a URI 220, a common order value 226 and a common preference value 228; a second data record entry 216 that includes a UI 222, the common order value 226 and the common preference value 228; a third data record entry 218 that includes a URI 224, the common order value 226 and the common preference value 228; and the subscriber telephone number 212. Each additional subscriber of the system, such as a subscriber B and a subscriber C, may have a subscriber record stored in the ENUM server 202.

In a particular illustrative embodiment, subscriber A may provide the contact data via the computer 203 and the Service Provider Application Server 205 that may provide an interactive user interface. The contact data provided by subscriber A may include data items stored in the subscriber record 210 including a plurality of URIs and a corresponding common order value and common preference value for each URI. For example, subscriber A may provide, via the computer 203, URI 220, the common order value 226 and the common preference value 228 to be stored in the first data record entry 214; the URI 222, the common order value 226 and the common preference value 228 to be stored in the second data entry record 216; and the URI 224, the common order value 226 and the common preference value 228 to be stored in the third data record entry 218; and the subscriber telephone number 212. The contact data may be stored by the ENUM server 202.

In another particular illustrative embodiment, subscriber A may provide the contact data via the alternative input device 207 (such as a telephone, Personal Digital Assistant (PDA), cell phone or other input device) to the Service Provider Representative 209. The contact data may be provided to the IMS 206 for input to the ENUM server 202.

Figure 3:
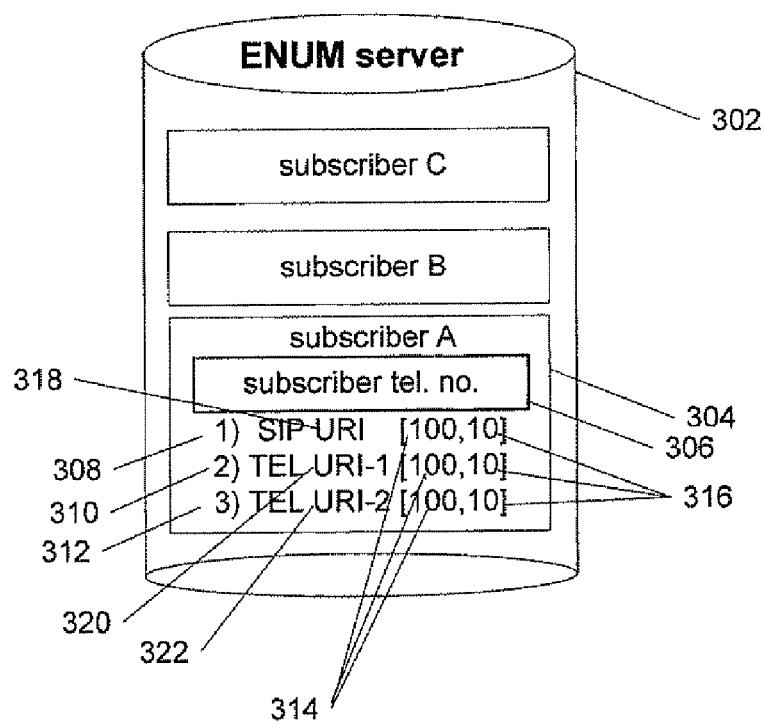
FIG. 3 is a diagram of a particular illustrative embodiment of a portion of a system to provision contact services in a communication network.

FIG. 3 is a diagram of a particular illustrative embodiment of a portion of a system to provision contact services in a communication network. An ENUM server 302 includes subscriber records for subscriber A, subscriber B, and subscriber C. A subscriber record 304 associated with subscriber A may include a subscriber telephone number 306 and plurality of data record entries, each data record entry including a URI associated with a corresponding destination device. For example, a URI 318 can be a SIP URI for SIP devices, and URIs 320 and 322 may be URIs for corresponding Public Service Telephone Network (PSTN) telephone devices. The data record entries 308, 310 and 312 that store corresponding URIs 308, 310, and 312 each have a corresponding order data 314 with a common value of 100, and corresponding preference data 316 with a common value of 10. The common order value and the common preference value may have been supplied by an application server of an IMS in response to receiving an indication that upon receipt of a contact request, the destination devices are to be contacted concurrently. When a call is placed to a subscriber telephone number 306, a command will be issued to initiate contact concurrently to the destination devices identified by URIs 308, 310, and 312. The particular illustration provided herein uses SIP and PSTN devices as example, and does not exclude use of other devices that may support other protocols at present or in the future.

Figure 4:
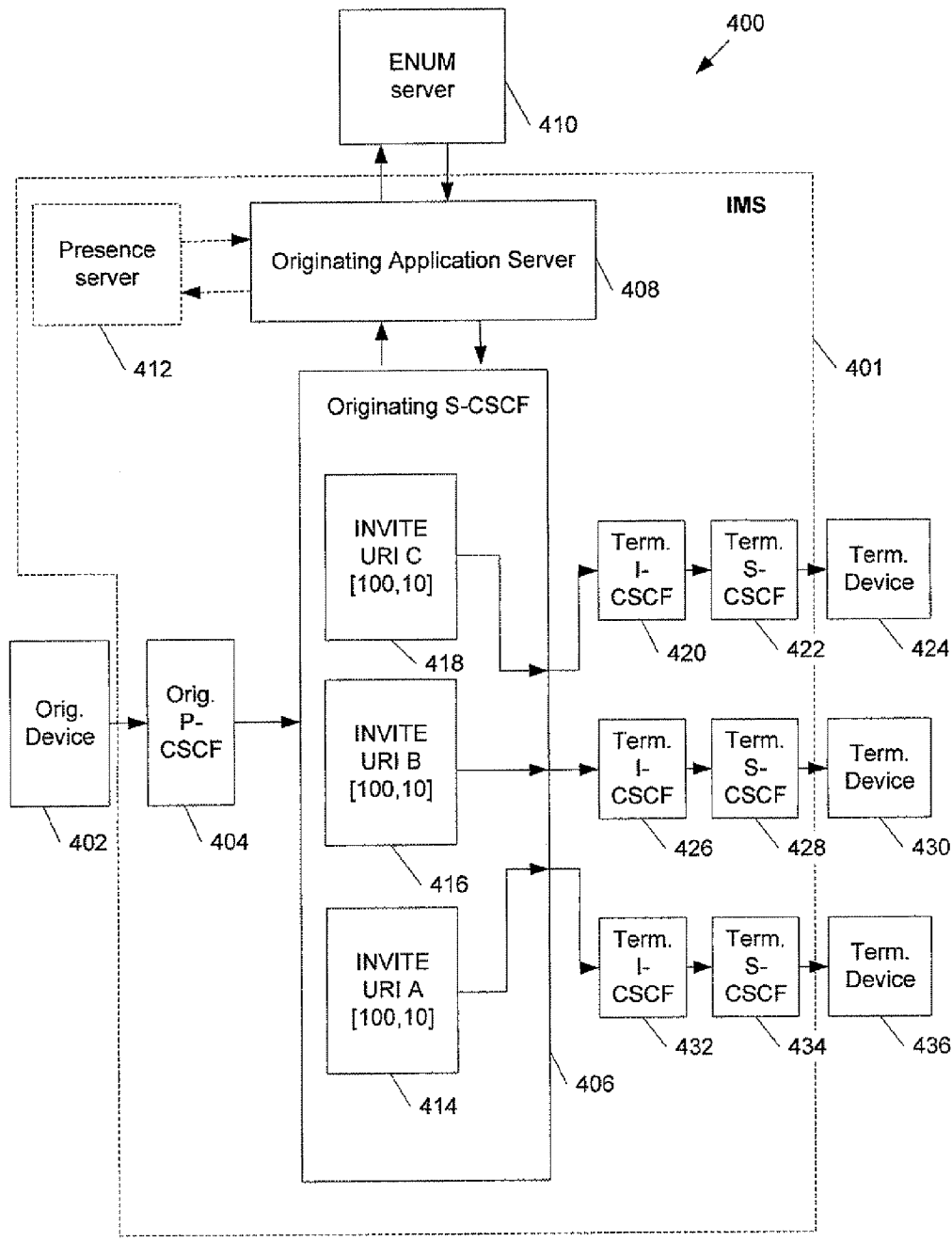
FIG. 4 is a diagram of a particular illustrative embodiment of a system to provide contact services in a communication network.

FIG. 4 is a diagram of a particular illustrative embodiment of a system to provide contact services in a communication network. A system 400 includes an IMS 401, an ENUM server 410, and an Originating Device 402. The IMS 401 includes an Originating Application Server 408, Originating Proxy-Call Session Control Function (P-CSCF) 404, an Originating Serving-Call Session Control Function (S-CSCF) 406, Terminating Interrogating Serving-Call Session Control Functions (I-CSCFs) 420, 426 and 432, and Terminating S-CSCFs 422, 428 and 434. Optionally, the IMS 401 may include a Presence Sever 412. An Originating Device 402 may place a call to a subscriber telephone number (such as an E.164 number) via the Originating P-CSCF 404 using a SIP INVITE message. The Originating P-CSCF 404 may receive the SIP INVITE request to place a call to the target E.164 number. The originating P-CSCF 404 may then send the SIP INVITE message to the Originating S-CSCF 406.

The Originating S-CSCF 402 may send an INVITE message, such as an E.164 INVITE message, to the Originating Application Server 408, which may then send a query to the ENUM server 410. The ENUM server 410 may return to the Originating Application Server 408 the data record entries including URIs and corresponding order values and preference values that are stored in a subscriber record corresponding to the subscriber telephone number called.

In a particular illustrative example, the Originating Application Server 408 may confirm an availability of destination devices associated with each of the URIs received to be connected to the Originating Device 402 by sending a query to the Presence Server 412. The Presence Server 412 may confirm the availability of each of the destination devices to be contacted, or may indicate that one or more of the destination devices associated with corresponding URIs are unavailable to be contacted, which may be supplied as device availability including an indication of which devices are unavailable to be contacted. If one or more destination devices are unavailable, INVITE messages are not issued to those destination devices that are unavailable. The Originating S-CSCF 406 may receive a command from the Originating Application Server 408 to initiate contact concurrently with corresponding devices identified by one or more of Uniform Resource Indicator (URI) A, URI B, and URI C, where their availability may have been suggested by the Presence Server 412. Each of the URIs has an associated common order value of 100 and an associated common preference value of 10. In the illustrative example, all URIs may be used to initiate contacts or a subset of URI A, URI B, and URI C may be used based on the presence information supplied.

A first INVITE message 418 can be issued to contact a first destination device identified by URI C. A second INVITE message 416 can be issued to contact a second destination device identified by URI B. A third INVITE message 414 can be issued to contact a third destination device identified by URI A. The INVITE messages 418, 416, and 414 may be issued concurrently. Concurrent issue of the INVITE messages means that the messages are issued approximately simultaneously. Concurrently contacting corresponding destination devices means that the INVITE messages are delivered approximately simultaneously to the corresponding destination devices. The INVITE message 418 may be sent to the Terminating I-CSCF 420, and subsequently sent from the Terminating I-CSCF 420 to the Terminating S-CSCF 422. The INVITE message 418 may then be sent from the Terminating S-CSCF 422 to the Terminating Device 424. The INVITE message 416 may be sent to the Terminating I-CSCF 426, and subsequently sent from the Terminating I-CSCF 426 to the Terminating S-CSCF 428. The INVITE message 418 may then be sent from the Terminating S-CSCF 428 to the Terminating Device 430. The INVITE message 414 may be sent to the Terminating I-CSCF 432, and subsequently sent from the Terminating I-CSCF 432 to the Terminating S-CSCF 434. The INVITE message 414 may then be sent from the Terminating S-CSCF 434 to the Terminating Device 436.

Figure 5:
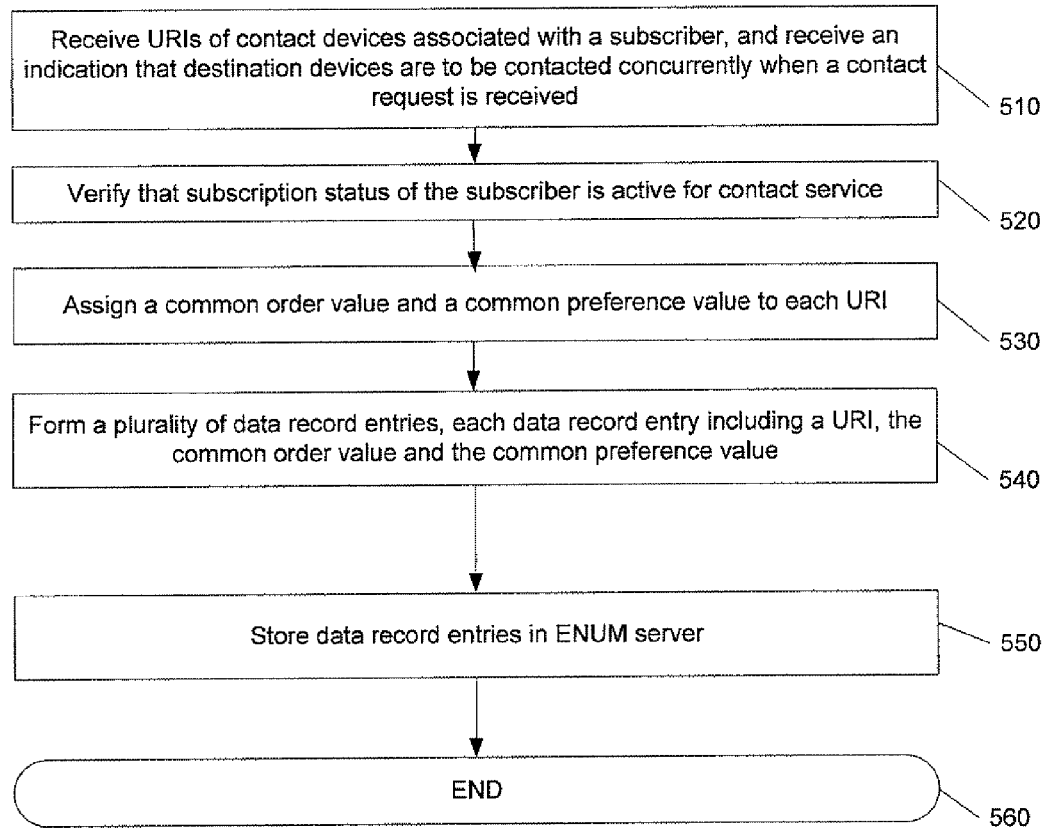
FIG. 5 is a flow chart of a particular illustrative embodiment of a method of storing contact information into a telephone number mapping (ENUM) server in a communication network.

FIG. 5 is a flow diagram according to a particular illustrative embodiment of a method of storing contact information into a telephone number mapping (ENUM) server in a communication network. At block 510, one or more URIs that identify corresponding destination contact devices associated with a subscriber are received. Additionally an indication is received specifying that all of the destination devices are to be contacted concurrently when a contact request is received. Moving to block 520, a subscription status of the subscriber is verified to be active for the contact service. Proceeding to block 530, a common order value and a common preference value is assigned to each of the URIs to be contacted concurrently when a contact request, i.e., a call to the subscriber telephone number, is received. Moving to block 540, a plurality of data record entries are formed, with each data record entry including a URI, the common order value and the common preference value. Proceeding to block 550, the method stores the data record entries associated with the subscriber in the ENUM server. The method terminates at 560.

Figure 6:
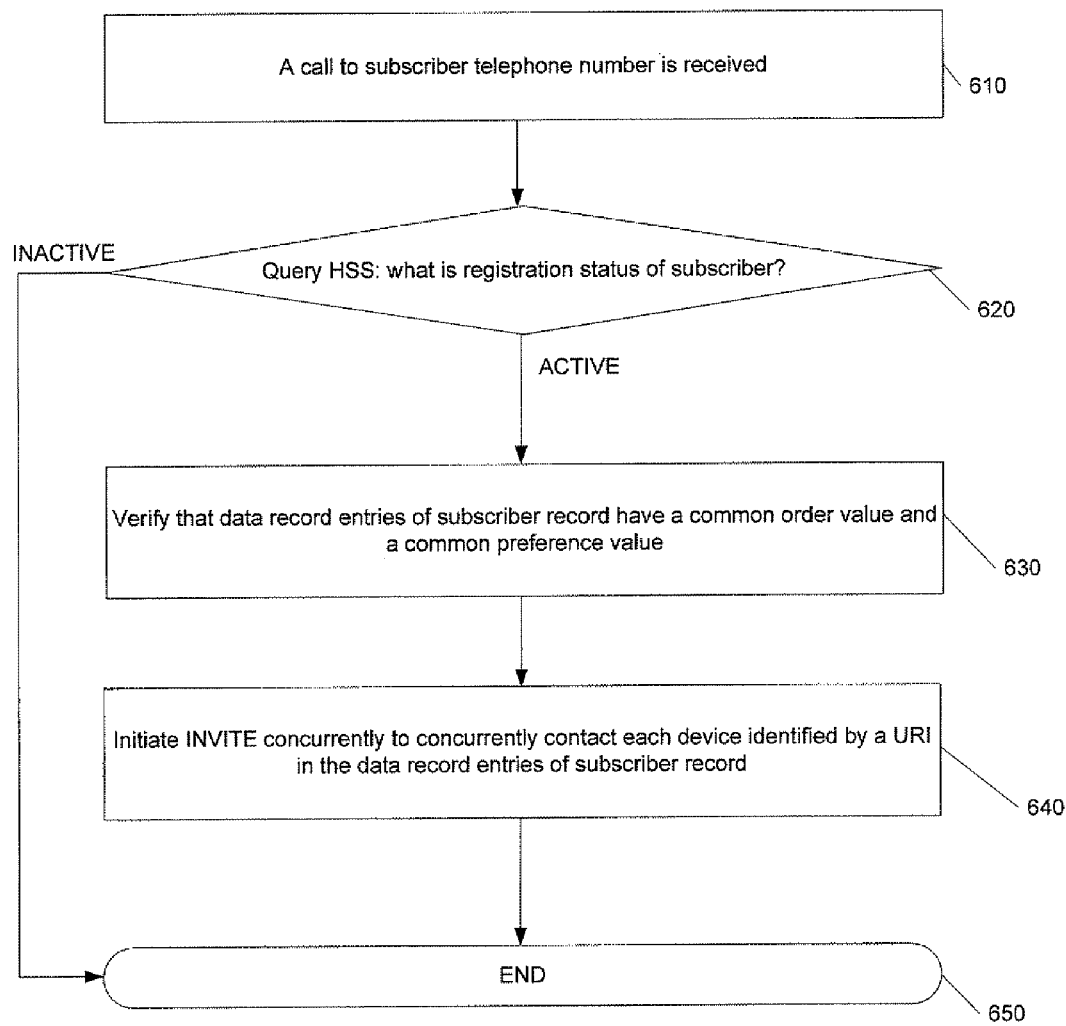
FIG. 6 is a flow chart of a first particular illustrative embodiment of a method to provide contact services in a communication network.

FIG. 6 is a flow diagram of a method of initiating contact with one of a plurality of destination devices, according to a particular illustrative embodiment. In the particular illustrative embodiment, each subscriber record of an ENUM server includes a plurality of data record entries, each data record entry including a URI, and all of the data record entries have a common order value and a common preference value. At block 610, a call placed to a subscriber telephone number is received, which constitutes a contact request. In a particular illustrative embodiment, the call is received by an Internet Protocol Multimedia Subsystem (IMS). Moving to decision block 620, an Originating S-CSCF in the IMS may query a Home Subscriber System (HSS) in the IMS to determine if a registration status of the subscriber for a contact service is active. If the registration status of the subscriber is inactive, the method ends at 650. If the registration status of the subscriber is active, the method proceeds to block 630, and the method verifies that the data record entries associated with the subscriber and stored in the server record in the ENUM server have a common order value and a common preference value. Proceeding to block 640, the method initiates invite messages concurrently via the IMS to concurrently contact devices identified by the URIs stored in the subscriber record. The method terminates at 650.

Figure 7:
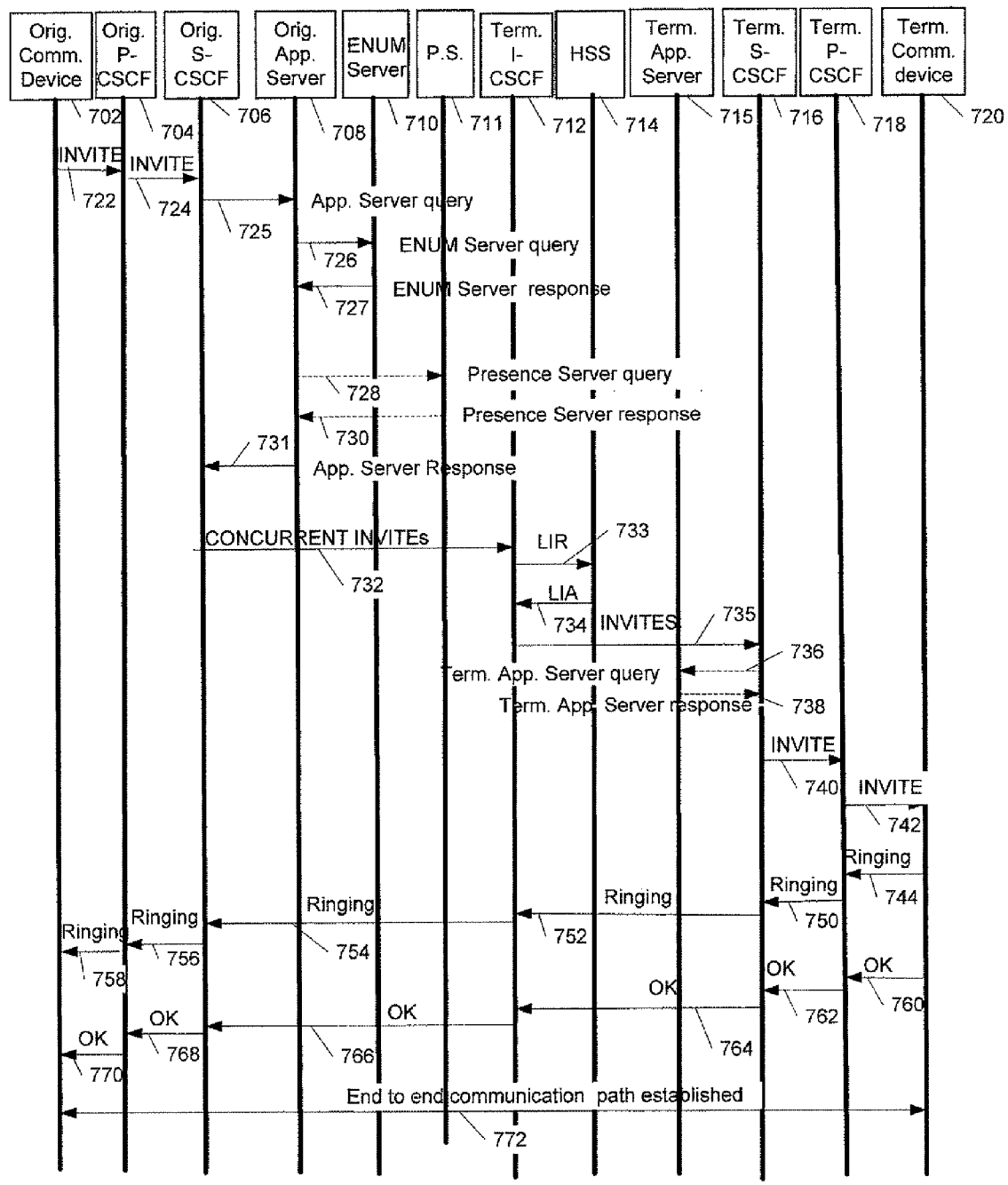
FIG. 7 is a ladder chart of a particular illustrative embodiment of a method to provide contact services in a communication network.

FIG. 7 is a ladder diagram according to a particular illustrative embodiment, illustrating message flow for a method of contacting a destination device. An Originating Communication Device 702 places a call to a subscriber telephone number and initiates an INVITE message 722 to an Originating P-CSCF 704. The Originating P-CSCF 704 sends an INVITE message 724 to an Originating S-CSCF 706. The Originating S-CSCF 706 sends an Application Server query 725 to an Originating Application Server 708. The Originating Application Server 708 sends an ENUM Server query 726 to an ENUM Server 710. The ENUM Server 710 returns an ENUM Server response 727 that includes data record entries in a subscriber record associated with the subscriber telephone number. The Originating Application Server 708 determines that each data record entry returned has a common order value and a common preference value.

Optionally, the Originating Application Server 708 may send a Presence Server query 728 to a Presence Server 711. The Presence Server 711 may send a Presence Server response 730 including an availability status of each of the destination devices identified by corresponding URIs in the data record entries returned in the ENUM server response 727.

The Originating Application Server 708 sends an Originating Application Server response 731 to the Originating S-CSCF 706 including a command to concurrently issue INVITE messages to concurrently contact devices identified by the URIs returned in the ENUM Server response 727, (In a particular illustrative embodiment, the Originating Application Server 708 may eliminate from the command any URIs that are unavailable, as indicated in the Presence Server response 730.) In response, the Originating S-CSCF 706 issues INVITE messages 732 concurrently to a Terminating I-CSCF 712, intended for destination devices identified by the corresponding URIs provided by the Originating Application Server 708. The Terminating I-CSCF 712 sends a Location Information Request (LIR) 733 to a Home Subscriber System 714, which returns a Location Information Answer (LIA) 734 to the Terminating I-CSCF 712. The Terminating I-CSCF 712 sends the INVITE messages 735 to Terminating S-CSCFs 716.

In a particular illustrative embodiment, the Terminating S-CSCF 716 may send a Terminating Application Server query 736 to a Terminating Application Server 715, to implement one or more terminating functions, and may send a Terminating Application Server response 738 to the Terminating S-CSCF 716.

Each Terminating S-CSCF 716 issues an INVITE message 740 to each Terminating P-CSCF 718 that corresponds to one of the destination devices to be contacted concurrently. Each Terminating P-CSCF 718 issues an INVITE message 742 to the corresponding Terminating Communication Device 720 (also destination device herein), with the INVITE messages 742 issued concurrently. Each of the Terminating Communication Devices 720 sends a RINGING message 744 to its corresponding Terminating P-CSCF 718, which sends a RINGING message 750 to the corresponding Terminal S-CSCF 716. The corresponding Terminal S-CSCF 716 sends a RINGING message 752 to the corresponding Terminating I-CSCF 712, which sends a RINGING message 754 to the Originating S-CSCF 706. The Originating S-CSCF 706 sends a RINGING message 756 to the Originating P-CSCF 704, which sends a RINGING message to the Originating Communication Device 702.

When contact is established with a particular Terminating Communication Device 720, the particular Terminating Communication Device 720 issues an OK message 760 to the corresponding Terminating P-CSCF 718, which sends an OK message 762 to the corresponding Terminating S-CSCF 716. The corresponding Terminating S-CSCF 716 sends an OK message 764 to the corresponding terminating I-CSCF 712, which sends an OK message 766 to the Originating S-CSCF 706. The Originating S-CSCF 706 sends an OK message 768 to the Originating P-CSCF 704. The Originating S-CSCF 706 also cancels INVITE messages to the other Terminating Communication Devices 720 with which contact has not yet been established. All attempts to contact other Terminating Communication Devices 720 are stopped, and if any other call is accepted, those other calls are terminated. The Originating P-CSCF 704 sends an OK message 770 to the Originating Communication Device 702. The IMS sets up an end-to-end communication path 772 between the Originating Communication Device 702 and the first available and ready Terminating Communication Device 720.

Figure 8:
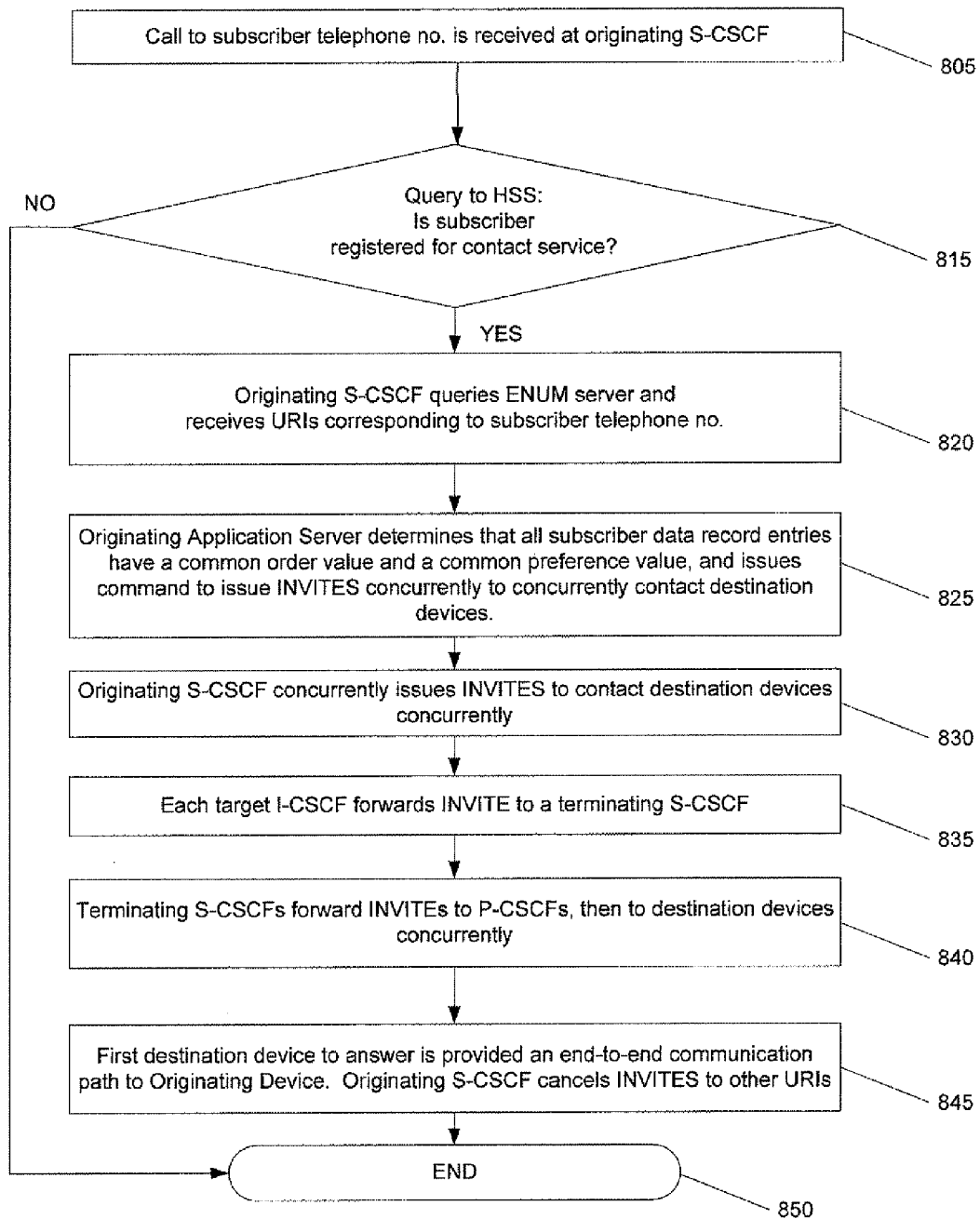
FIG. 8 is a flow chart of a second particular illustrative embodiment of a method to provide contact services in a communication network.

FIG. 8 is a flow chart of a second particular illustrative embodiment of a method to provide contact services in a communication network. Each URI in a subscriber record stored in an ENUM server has a corresponding common order value and a common preference value. At block 805, a call is placed at an Originating Device to a subscriber telephone number associated with a subscriber constitutes a contact request and is received at an Originating Serving-Call Session Control Function (S-CSCF) of an Internet Protocol Multimedia Subsystem (IMS). Proceeding to decision block 815, a Home Subscriber Server (HSS) may be queried to determine if the subscriber is registered for a contact service. If the subscriber is not registered for the contact service, the method terminates at 850. If the subscriber is registered for the contact service, moving to block 820 the Originating S-CSCF queries the ENUM server and receives URIs corresponding to the subscriber telephone number. Moving to block 825, an Originating Application Server determines that all data record entries of a subscriber record at the ENUM server have a common order value and a common preference value. The Originating Application Server issues a command to issue INVITE messages concurrently to concurrently contact destination devices identified by the URIs in the subscriber record.

Proceeding to block 830, the Originating S-CSCF issues INVITE messages concurrently to concurrently contact each of the associated destination devices that are identified by the URIs in the subscriber record. Proceeding to block 835, each target I-CSCF of a URI forwards an INVITE message to a corresponding Terminating S-CS CF. Moving to block 840, each Terminating S-CSCF forwards an INVITE message to a corresponding P-CSCF to contact the destination devices concurrently. Moving to block 845, a first destination device to answer is connected by an end-to-end communication path to the Originating Device, and attempts to contact other devices are stopped, such as by the Originating S-CSCF canceling INVITEs to other called devices, and if any other terminating device answers a call, any such additional call is terminated. An end-to-end communication path is provided between the Originating Device and the first destination device to answer. The method terminates at 850.

Destination devices may include VoIP devices, cellular telephones via a wireless network, home telephone via e.g., VoIP, PSTN, or another network, Personal Digital Assistants via an IP network, computers via an IP network, or other devices. A communication provided to the destination device after contact is established may be a pre-recorded message, an instant message (N), electronic mail (E-Mail), a page via a pager, a live call or another message.

Figure 9:
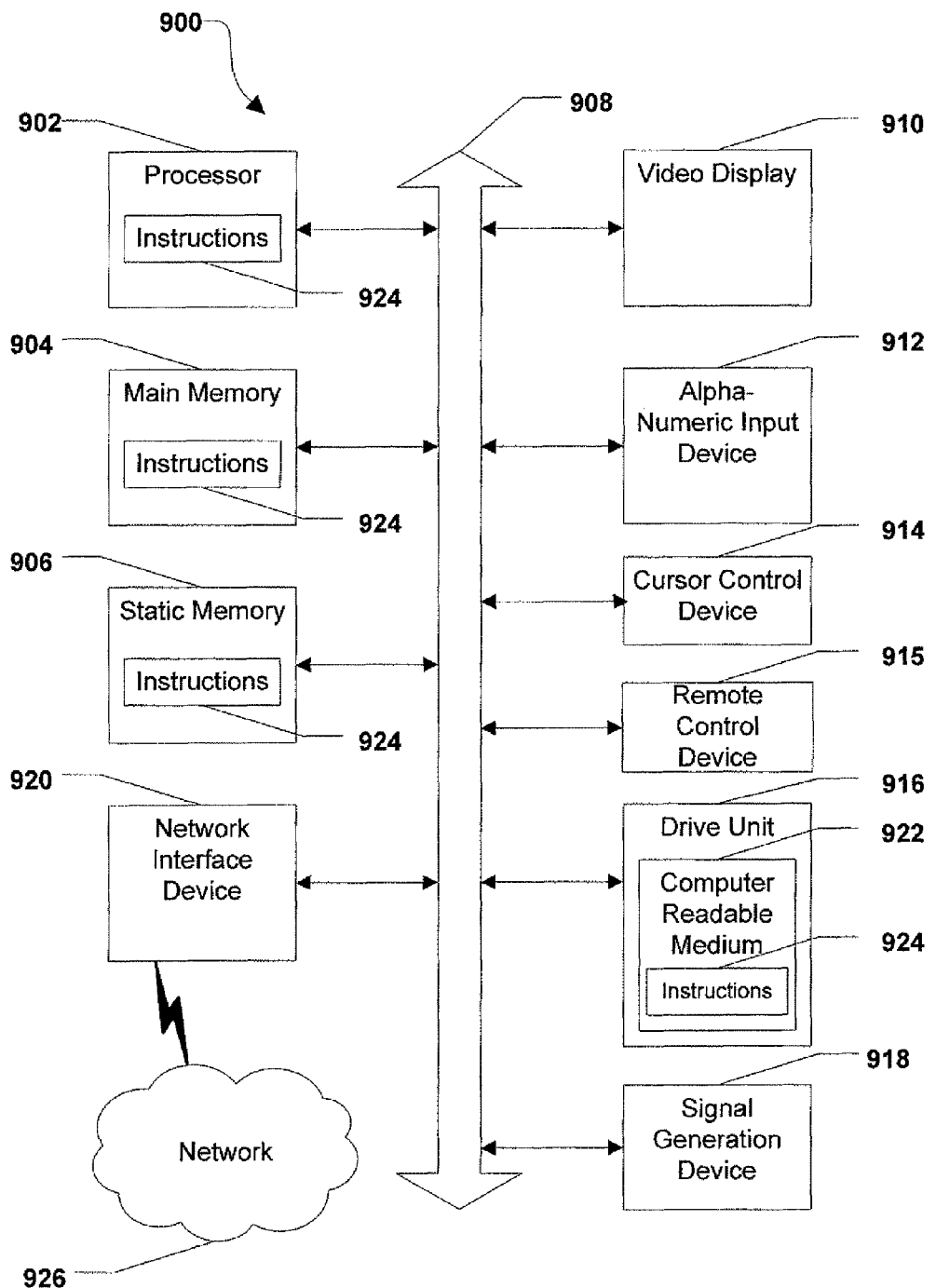
FIG. 9 is a general diagram of a particular illustrative embodiment of a computer system.

FIG. 9 is a general diagram of a particular illustrative embodiment of a computer system 900. The computer system 900 can include a set of instructions that can be executed to cause the computer system 900 to perform any one or more of the methods or computer based functions disclosed herein. The computer system 900 may operate as a standalone device or may be connected, e.g., using a network, to other computer systems, or peripheral devices, including an ENUM server, an HSS, components of an IMS, or Originating and destination devices, as shown in FIGS. 1-4.

In a networked deployment, the computer system may operate in the capacity of a content source, network management system, a server, set-top box device, or network switch. The computer system 900 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 900 can be implemented using electronic devices that provide voice, video or data communication. Further, while a single computer system 900 is illustrated, the term "system" shall also be taken to include any collection of systems or sub-systems that individually or jointly execute a set, or multiple sets, of instructions to perform one or more computer functions.

As illustrated in FIG. 9, the computer system 900 may include a processor 902, e.g., a central processing unit (CPU), a graphics processing unit (GPU), or both. Moreover, the computer system 900 can include a main memory 904 and a static memory 906, which can communicate with each other via a bus 908. As shown, the computer system 900 may further include a video display unit 910, such as a liquid crystal display (LCD), an organic light emitting diode (OLED), a flat panel display, a solid state display, or a cathode ray tube (CRT). Additionally, the computer system 900 may include an input device 912, such as a keyboard, a cursor control device 914, such as a mouse, and a remote control device 915. The computer system 900 can also include a disk drive unit 916, a signal generation device 918, such as a speaker or remote control, and a network interface device 920.

In a particular embodiment, as depicted in FIG. 9, the disk drive unit 916 may include a computer-readable medium 922 in which one or more sets of instructions 924, e.g. software, can be embedded. Further, the instructions 924 may embody one or more of the methods or logic as described herein. In a particular embodiment, the instructions 924 may reside completely, or at least partially, within the main memory 904, the static memory 906, and/or within the processor 902 during execution by the computer system 900. The main memory 904 and the processor 902 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 924 or receives and executes instructions 924 so that a device connected to a network 926 can communicate voice, video or data over the network 926. Further, the instructions 924 may be transmitted or received over the network 926 via the network interface device 920.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device Accordingly, the disclosure is considered to include any one or more of a computer-readable medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system comprising:
one or more servers including logic to:
receive a contact request from an originating party, wherein the contact request is directed to a telephone number of a particular device of a plurality of devices associated with a subscriber;
in response to the contact request, retrieve a plurality of data record entries associated with the subscriber from a telephone number mapping server, wherein each data record entry of the plurality of data record entries identifies one of the plurality of devices associated with the subscriber;
recognize that preference data in each of the plurality of data record entries has a common value, wherein each data record entry includes a uniform resource identifier;
issue a command to initiate contact concurrently with each of the plurality of devices, wherein initiating contact concurrently with each of the plurality of devices comprises issuing invite messages to each of the plurality of devices, wherein each invite message results in a connection attempt to a corresponding device; and
upon establishing a connection to a single device associated with the subscriber, cancel the invite messages to all devices associated with the subscriber other than the single device and establish a communication path from the originating party to the single device.

2. The system of claim 1, wherein the contact request comprises a call to the telephone number.

3. The system of claim 1, wherein the plurality of devices includes a public switched telephone network device or a public land mobile network device.

4. The system of claim 1, wherein the logic configured to:
determine a device availability, the device availability comprising an indication of which of the plurality of devices are unavailable to be contacted.

5. The system of claim 1, wherein the logic is configured to recognize that order data in each of the plurality of data record entries has a common order value.

6. A method comprising:
receiving a contact request from an originating party, wherein the contact request is directed to a phone number of a particular device of a plurality of devices associated with a subscriber;
in response to the contact request, retrieving a plurality of data record entries associated with the subscriber from a telephone number mapping server, wherein each data record entry of the plurality of data record entries identifies one of the plurality of devices associated with the subscriber;
determining that order data in each of the plurality of data record entries have a common order value and determining that preference data associated with a plurality of uniform resource identifiers in the plurality of data record entries have a common preference value;
initiating invite messages concurrently to each of the plurality of devices associated with the subscriber; and
when contact has been established with a single device associated with the subscriber, establishing a communication path from the originating party to the single device and cancelling the invite messages to all devices associated with the subscriber other than the single device.

7. The method of claim 6, further comprising verifying that a registration status of a subscriber account associated with the subscriber is active before initiating the invite messages.

8. A method of registering a plurality of devices of a subscriber, the method comprising:
receiving a plurality uniform resource identifiers associated with the subscriber, each uniform resource identifier identifying a device associated with the subscriber;
receiving an indication that upon receipt of a contact request the devices associated with the subscriber are to be contacted concurrently;
assigning a common order value and a common preference value to each of the plurality of uniform resource identifiers in response to receiving the indication;
forming a plurality of data record entries, wherein each of the plurality of data record entries includes one of the plurality of uniform resource identifiers and includes the common order value and the common preference value;
storing the plurality of data record entries in a telephone number mapping server;
initiating when contact with each of the devices concurrently via invite messages upon receipt of the contact request; and
when contact is established with a single device, cancelling the invite messages to all devices associated with the subscriber other than the single device.

9. The method of claim 8, wherein the plurality of uniform resource identifiers is specified by the subscriber.

10. The method of claim 8, wherein the indication is received from the subscriber.

11. The method of claim 8, further comprising associating the plurality of data record entries with a subscriber telephone number.

12. The method of claim 11, wherein the contact request comprises a call to the subscriber telephone number.

13. The method of claim 8, wherein the common preference value is assigned by an application server.

14. The method of claim 13, wherein the application server is part of an Internet protocol multimedia subsystem.

15. A non-transitory computer-readable storage medium including computer-executable instructions that, when executed by a processor, cause the processor to:
receive a contact request from an originating party, wherein the contact request is directed to a telephone number of a particular device of a plurality of devices associated with a subscriber;
initiate invite messages concurrently to contact each of the plurality of devices associated with the subscriber in response to the contact request, wherein the plurality of devices are identified by a corresponding plurality of uniform resource identifiers that are stored in a telephone number mapping server, and wherein each of the plurality of uniform resource identifiers has a common order value and a common preference value associated therewith;
receive an acknowledgement that contact has been established with a single device associated with the subscriber;and
after receiving the acknowledgement, cancel the invite messages to all devices associated with the subscriber other than the single device.

16. The non-transitory computer-readable storage medium of claim 15, further comprising computer-executable instructions that, when executed by the processor, cause the processor to establish a communication path between the originating party and the single device.

17. The non-transitory computer-readable storage medium of claim 15, further comprising computer-executable instructions that, when executed by the processor, cause the processor to assign the common preference value to each of the plurality of uniform resource identifiers in response to instructions issued by the subscriber.

18. The non-transitory computer-readable storage medium of claim 15, further comprising computer-executable instructions that, when executed by the processor, cause the processor to verify that the subscriber is actively registered with a contact service prior to initiating the invite messages.

19. The system of claim 1, wherein the logic is further configured to, upon establishing the connection to the single device, provide a communication to the single device.

20. The system of claim 19, wherein the communication is a pre-recorded message.

21. The system of claim 19, wherein the communication is one of an instant message, an e-mail message, and a page.

* * * * *